US006873072B2

(12) United States Patent
Ganter et al.

(10) Patent No.: US 6,873,072 B2
(45) Date of Patent: Mar. 29, 2005

(54) RELAY SUPPORT DEVICE FOR AN ELECTRIC MOTOR, IN PARTICULAR FOR AN ELECTRICALLY COMMUTATED DC MOTOR

(75) Inventors: Helmut Ganter, Dürrheim (DE); Joachim Heizmann, Immendingen (DE); Oswald Kuwert, Tutschfelden (DE); Hans-Joachim Wysk, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/473,954

(22) PCT Filed: Apr. 25, 2002

(86) PCT No.: PCT/EP02/04606

§ 371 (c)(1),
(2), (4) Date: Mar. 16, 2004

(87) PCT Pub. No.: WO03/001646

PCT Pub. Date: Jan. 3, 2003

(65) Prior Publication Data

US 2004/0145261 A1 Jul. 29, 2004

(30) Foreign Application Priority Data

Jun. 22, 2001 (DE) .......................................... 101 30 118

(51) Int. Cl.$^7$ .............................................. H02K 11/00
(52) U.S. Cl. .................. 310/68 R; 310/91; 310/DIG. 6
(58) Field of Search ................................ 310/91, 68 R, 310/70 R, 70 A, 71, DIG. 3, DIG. 6

(56) References Cited

U.S. PATENT DOCUMENTS

| | | | |
|---|---|---|---|
| 2,777,963 A | 1/1957 | Kuntz | 310/86 |
| 4,205,246 A | 5/1980 | Wise et al. | 310/68 C |
| 4,695,735 A | 9/1987 | Tallis, Jr. et al. | 290/38 R |
| 5,127,440 A | 7/1992 | Maas et al. | 137/884 |
| 5,528,093 A * | 6/1996 | Adam et al. | 310/89 |
| 5,770,902 A * | 6/1998 | Batten et al. | 310/71 |
| 5,821,663 A | 10/1998 | Kiehnle et al. | 310/249 |
| 5,910,716 A * | 6/1999 | Olsen et al. | 318/254 |
| 6,127,752 A * | 10/2000 | Wiesler | 310/68 B |
| 6,211,631 B1 * | 4/2001 | Wilson-Jones et al. | 318/12 |
| 6,268,669 B1 * | 7/2001 | Wakao et al. | 310/67 R |
| 6,317,332 B1 * | 11/2001 | Weber et al. | 361/760 |
| 6,380,648 B1 * | 4/2002 | Hsu | 310/67 A |
| 6,577,030 B2 * | 6/2003 | Tominaga et al. | 310/68 B |

FOREIGN PATENT DOCUMENTS

| | | | |
|---|---|---|---|
| DE | 3629634 | 1/1990 | .......... H02K/18/00 |
| DE | 4231784 | 3/1994 | .......... H02K/11/00 |
| DE | 19723664 | 12/1997 | .......... H02K/11/00 |
| GB | 2251522 | * 7/1992 | .......... H02K/11/00 |

* cited by examiner

Primary Examiner—Burton Mullins
(74) Attorney, Agent, or Firm—Duane Morris LLP

(57) ABSTRACT

The invention relates to a relay supporting unit for an electric motor to arrange a number of relays at the end of the electric motor, at which winding connections and signal lines of the electric motor are provided. The relays are used to connect and interrupt the power supply to the motor windings. The relay supporting unit according to the invention features a supporting component which is designed in such a way that it extends over the end of the electric motor and has at least one, preferably several, chambers to accommodate and position the relays. A connecting frame is integrated into the supporting component to electrically connect the winding connections and the relays. Furthermore, a sensor PCB is also preferably integrated to which the signal lines of the electric motor can be connected. With the relay supporting unit according to the invention, it is possible to pre-assemble high-voltage bearing electronic components to control the motor winding of the electric motor as well as low-voltage bearing electronic components to record the signals of the electric motor in one single component.

27 Claims, 5 Drawing Sheets

Figure 1:
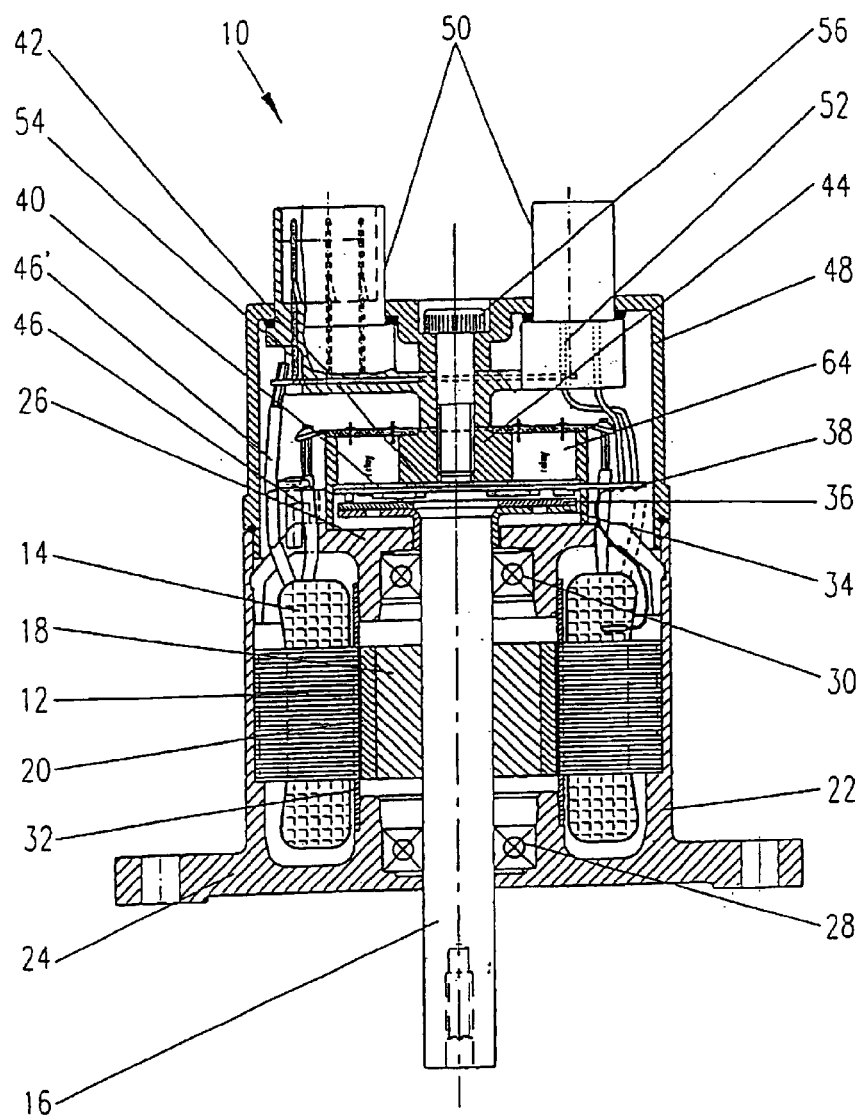

RELAY SUPPORT DEVICE FOR AN ELECTRIC MOTOR, IN PARTICULAR FOR AN ELECTRICALLY COMMUTATED DC MOTOR

The invention relates to a relay supporting unit for an electric motor, particularly for an electronically commutated direct current (DC) motor, to arrange a number of relays at one end of the electric motor at which the winding connections and the signal lines of the electric motor are located. The relays function in particular to connect and interrupt the motor power lines, i.e. the power supply lines for the stator windings of the electric motor. The invention can also be used in all other kinds of electronic motors and generators which use relays for connecting and interrupting power lines.

In general, the invention relates to brushless DC motors or electronically commutated DC motors which are used, for example, in the automobile industry for steering systems and for other uses such as ventilators, air conditioning systems, coolers etc. Since the DC motor is installed in the vicinity of the motor vehicle's internal combustion engine, it must be resistant to extreme temperatures, moisture, dirt and other environmental influences. Furthermore, automobile manufacturers also generally require a lower ohmic winding resistance for the entire motor and tighter resistance tolerances as well as lower inductivity of the entire arrangement. Consequently, DC motors for such applications have to be robust and have to keep within tighter manufacturing tolerances.

Electronically commutated DC motors generally include a permanent magnet which is fitted to a shaft and has several alternating magnetic poles in the circumferential direction, as well as a stator which has several drive windings which interact with the magnetic poles of the rotor. The DC motor is enclosed by a housing which is connected to a mounting flange to mount the motor. At the end face of the DC motor at which the end winding and the electronic connections to supply and drive the motor are found, the housing is sealed, for example, by a head cap. In a DC motor of the prior art, the winding ends of the stator windings are generally borne on the end winding head of the stator and then lead away bundled from the stator via a cable exit to an electronic drive. The winding ends of the stator windings of the electric motor are normally connected to power supply lines via relays in order to connect and interrupt these winding ends. The relays are usually situated on their own main electronic printed circuit board (PCB) inside or outside the motor housing.

In addition, an electronically commutated DC motor frequently features a sensor PCB with its associated sensor assemblies to detect the speed, rotational position etc. of the electric motor.

In the known electric motors, the problem exists that the positioning and mounting of the main PCB for electronic switch as well as that of the sensor PCB in a correct position relative to the stator of the electric motor, is both critical and labor intensive.

The underlying object of the invention is to submit a new design for an electric motor or a generator having relays to connect and interrupt power lines which enables simple assembly, in particular, the precise positioning and adjustment of the switching components. The intent of the invention is to provide an electric motor with a compact construction particularly of the safety-relevant switching components to control and supply the stator windings as well as the sensor electronics to register the revolutions per minute and the rotational position of the motor.

This task has been achieved through a supporting unit for an electric motor with the characteristics outline in the claims that follow.

In one embodiment, the invention provides a relay supporting unit for an electric motor to arrange a number of relays at one end of the electric motor, at which the winding connections and the signal lines of the electric motor are located. The relay supporting unit includes a supporting component which is designed in such a way that it extends over the end face of the electric motor and features at least one, preferably several, chambers to accommodate and position the relays. A connecting component, particularly a lead frame, is integrated into the supporting component to electronically connect the winding connections and the relays.

The relay supporting unit according to the invention can be pre-assembled with the relays needed to control the electric motor as well as the lead frame, whereby the relays are pre-positioned in their correct alignment within the chambers. The supporting component enables the relays and the lead frame to be automatically aligned correctly to each other and they can then be connected to each other in an automated assembly process such as wave or re-flow soldering. The entire assembly can be connected via the lead frame to the winding ends of the stator windings.

The supporting component of the relay supporting unit according to the invention is preferably made of high temperature resistant plastic and in particular by injection molding, whereby the lead frame can be embedded in the plastic in such a way that it is firmly held in the supporting component. The lead frame is preferably made of sheet metal and particularly made in the form of a stamped bent component. These characteristics particularly enable the relay supporting unit to be manufactured at reasonable cost since it can be injection molded and assembled fully automatically. The manufacture of the power conducting track sections in the form of a lead frame has the added advantage of ensuring that sufficiently high power loads of up to 100 ampere and more can be processed. The result is an extremely robust, compact assembly which can be manufactured at a reasonable cost and which can be automatically pre-assembled, including the relays, and connected as a whole to the electric motor and in particular to the winding ends of the stator windings.

A particularly beneficial embodiment of the invention provides that a sensor PCB is also connected to the supporting component, to which the signal lines of the electric motor can be connected. This sensor PCB can, for example, have Hall sensors or measuring coils to record the rotational speed and the rotational position of the rotor, whereby the signals generated by the sensors derived from the rotational speed and the rotational position are lead from the motor via the signal lines. The lead frame is preferably positioned on an outer surface of the supporting component facing away from the electric motor and the sensor PCB on an inner surface of the supporting component opposite the lead frame. Of particular preference, the sensor PCB is encapsulated in the supporting component, whereby provision can be made that the supporting component defines a tightly sealed space to accommodate the sensor PCB. Encapsulation has the function of stabilizing and fixing all components and protecting them against the intrusion of harmful particles.

This provides the further benefit that both the relays and the relay connection leads in lead frame technology as well as the sensor PCB with its sensor assemblies can be integrated into one and the same pre-mountable assembly. The invention creates a new type of integration of low-current (<1 ampere) powered motor logic and sensorics with the high-current (in the region of up to 100 ampere) switching components. This further simplifies the assembly of the electric motor with the relay supporting unit of the invention. Together with the relays and their connection leads, the entire sensorics can be pre-positioned and adjusted in the supporting component so that during the assembly of the electric motor only the relay supporting unit containing the relays, the lead frame and the sensor PCB has to be positioned and attached in relation to the stator of the motor.

According to the invention, this is achieved in that the supporting component can be rotatably and thus adjustably arranged at the end face of the electric motor. For this purpose, the supporting component preferably features mounting tabs protruding from its circumference for attachment at the end of the electric motor. The mounting tabs can, for example, be fitted with elongated holes so that the supporting component can be set at the end of the electric motor and turned within a restricted arc for its fine adjustment.

As mentioned above, relays are preferably pre-mounted in the supporting component. Just like the sensor PCB, these can be encapsulated in the supporting component. Encapsulating the individual components in the supporting component and providing a tightly sealed space to accommodate the sensor PCB in the supporting component ensure that the individual components in the relay supporting unit are protected against the intrusion of foreign bodies, moisture or suchlike and that their attachment is vibration-proof.

The precise positioning of the switching relays and the lead frame in relation to the winding connections of the stator windings is important to enable the winding ends of the stator windings to be connected to the relays in the required position and with low resistance tolerances. The sensor PCB with the associated sensor assemblies such as Hall elements, measuring coils or suchlike has to be precisely positioned and adjusted relative to the stator and the rotor of the electric motor to be able to correctly determine the rotational speed and rotational position of the motor. Integrating the sensor PCB into the supporting component makes this possible without any problems.

In one preferred embodiment of the relay supporting unit according to the invention, the supporting component has two to nine chambers and in particular three or six chambers to accommodate relays to control a three-phase motor. To integrate the lead frame in the correct position into the supporting component, the supporting component features depressions to position the lead frame and to insulate its sides.

Figure 2:
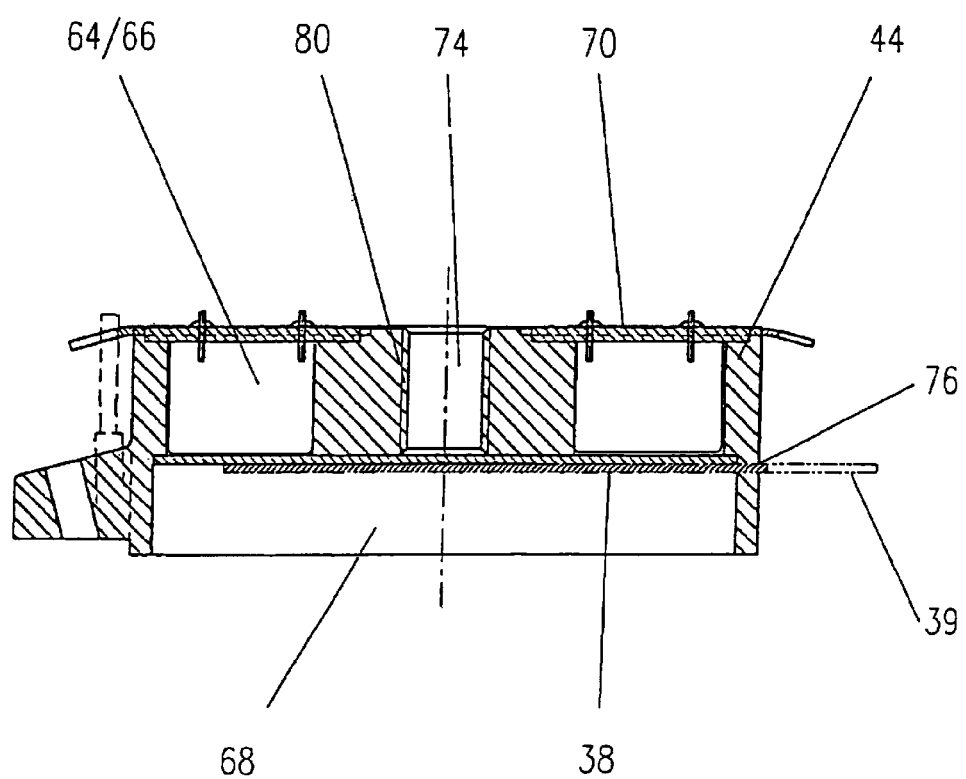
Figure 3:
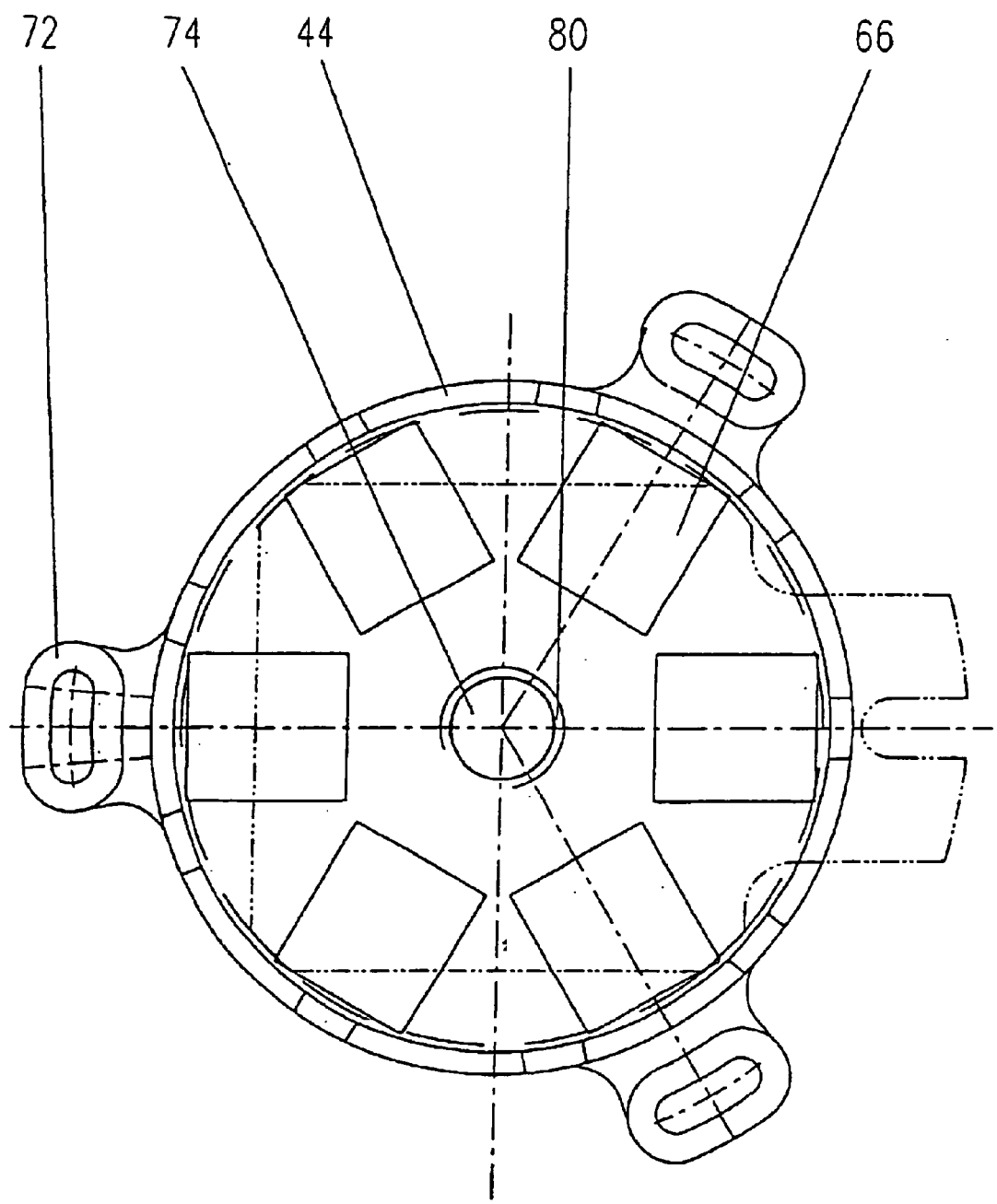
Figure 4:
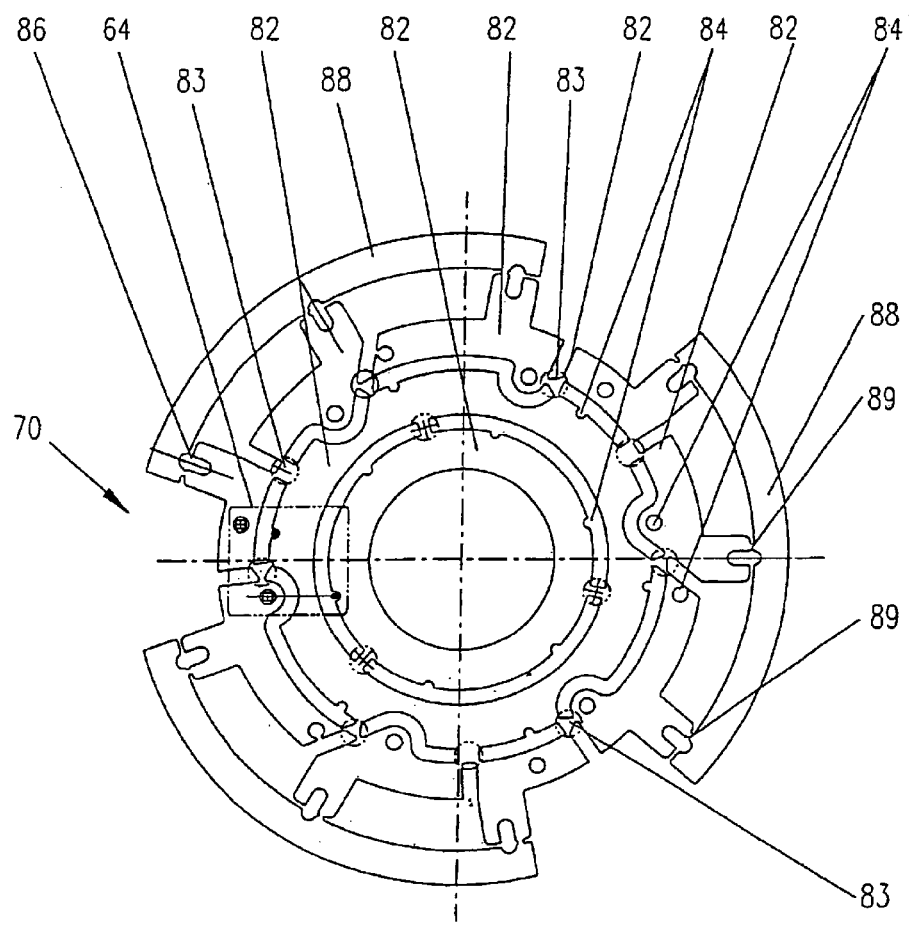
Figure 5:
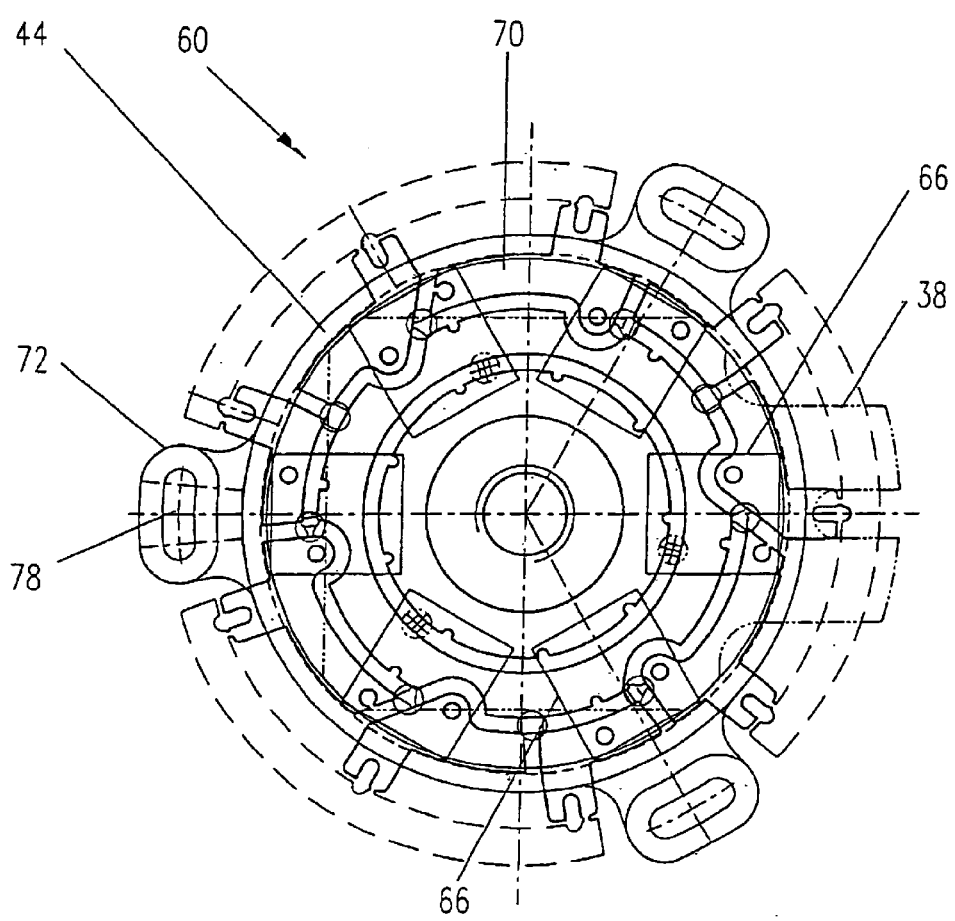

The invention is explained in more detail below on the basis of preferred embodiments with reference to the drawings. The figures show:

FIG. 1 a sectional view through an electric motor with a relay supporting unit according to the invention;

FIG. 2 a sectional view of the relay supporting unit according to one embodiment of the invention, which is installed in the electric motor in FIG. 1;

FIG. 3 a view from above of the relay supporting unit according to the invention;

FIG. 4 a view from above of a lead frame for a relay supporting unit according to the invention; and FIG. 5 a view from above of the relay supporting unit according to the invention in which the lead frame and the sensor PCB are installed.

FIG. 1 shows a sectional view of an electronically commutated DC motor according to the invention which can particularly be employed in the automobile industry and there, for example, in steering systems. The DC motor which is generally identified with 10, has a stator with a stator stack 12 and stator windings 14. A rotor with a shaft 16, an iron yoke ring 18 situated on the shaft 16 and a permanent magnet 20 which is segmented or annular are located within the stator.

The stator and rotor are enclosed in a housing 22 which is sealed at one end by a mounting flange 24 and at the opposite end by a flange 26, whereby the shaft 16 protrudes from the mounting flange 24 end, and at the flange 26 end, the signal lines 52 and winding connections 46, 46' of the motor are located.

The shaft 16 is rotatably held in the flanges 24 and 26 by bearings 28 and 30 e.g. roller or journal bearings, in particular ball bearings.

In the embodiment illustrated, a stationary sleeve 32, which encircles the rotor and prevents the intrusion of foreign bodies into the rotor assembly, can be provided concentrically between the stator assembly 22, 12 and the rotor assembly 16, 18, 20.

A DC motor which has a similar construction to the DC motor shown in FIG. 1 is described in further detail in the German Patent Applications 100 34 302.3 and 100 51 403.0, to which reference is made. It should be emphasized that the relay supporting unit according to the invention can be used in conjunction with any other known type of DC motor or a type yet to be developed and it can also be deployed in generators. The embodiment illustrated in FIG. 1 serves only as an example.

Support means 34 are mounted onto the shaft 16 of the DC motor shown in FIG. 1 on which a magnet ring 36 is fitted. A sensor PCB 38 is placed opposite and parallel to the support means 34 and the magnet ring 36 on which are situated coils 40, Hall elements and other sensor assemblies on the side facing the magnet ring 36. On the reverse side of the sensor PCB 38 facing away from the magnet ring 36, an iron yoke component 42 is found. The sensor PCB 38 arrangement is described in more detail below.

As can be seen in FIG. 1, the support means 34 and the ring magnet 36 placed on it rotate together with the shaft 16, whereas the sensor PCB 38 with the coils 40, Hall elements etc. arranged on it is stationary, so that through the rotation of the shaft 16, as a result of the relative movement between the ring magnet 36 and the sensor PCB 38, signals related to the rotational position are generated in the coils 40, Hall elements or other sensor elements. The expert will be well aware that for the functioning of the sensorics, it is essential that the sensor PCB is precisely positioned in relation to the support means 34 and the ring magnet arranged on it. In another embodiment of the invention, the sensor PCB 38 can also interact directly with the permanent magnet 20 to generate signals related to the rotational position.

As shown in FIG. 1, the sensor PCB 38 is attached to the inner surface facing the electric motor of a supporting component 44 of a relay supporting unit. Relays 64 are mounted on the supporting component 44 of the relay supporting unit which are connected to the winding ends 46 of the stator windings 14 as described below in more detail.

The DC motor shown in FIG. 1 is closed by a housing cover 48 which features integrated socket/plug components 50 which are connected to the signal lines 52 or the winding ends 46' of the stator windings 14 via a connecting piece 54.

The housing cover 48 is held in position on the relay support by a center screw 56, appropriate snap clasps and/or by bonding.

As mentioned, the relay supporting unit according to the invention can be used in connection with other types of DC motors or generators, whereby in particular the design of the housing 22 and the housing cover 24, the arrangement and connection of the various electronic components within the housing cover 48 as well as the design of the rotor and the stator can take every conceivable and known form.

As shown in FIG. 1, the relay supporting unit is positioned at the end of the rotor/stator unit and holds the relays 64 and the sensor PCB 38 in position relative to the stator, whereby the winding ends 46 of the stator windings and the signal lines 52 are connected to the components held in the relay supporting unit.

As described above, the relay supporting unit according to the invention is used to position and hold the switching relays 64 and the sensor PCB 38 exactly in place. The sensor electronics has the function of setting the optimum timing for the stator windings 14 for the DC motor to run clockwise or anti-clockwise. In the preferred embodiment of the invention, which relates to a three-phase, electronically commutated DC motor, the sensor electronics specifically separates the neutral point of the motor in order to connect and interrupt the stator windings as required. The relays 64 are used to switch off the current to the windings in cases of failure.

One embodiment of the relay supporting unit 60 according to the invention is shown in large scale in FIG. 2. It includes a supporting component 44 which is preferably injection molded from a high temperature resistant plastic and features several eccentrically arranged chambers 66, in the preferred embodiment six chambers, for the correct positioning of the relays 64 and its vibration-proof attachment.

In a preferred embodiment, the relay supporting unit 60 has a central bore 74 with an internal thread 80, so that it can be attached, for example, by means of the center screw 56 shown in FIG. 1. Other means of attaching the relay supporting unit, for example, by means of direct screwing, bonding or suchlike also lie within the scope of the invention.

A cavity 68 is defined in the supporting component 44 which is used to accommodate the sensor PCB 38, whereby the PCB 38 can be encapsulated in the cavity 68 to protect it against the intrusion of foreign bodies, moisture or suchlike. On the sensor PCB 38 (FIG. 1; not shown in FIG. 2) are arranged sensor components such as measuring coils, Hall sensors or suchlike which interact with the ring magnet 36 on the supporting component 44 which rotates with the shaft 16, in order to create signals in relation to the rotational position. On the reverse side of the sensor PCB 38, an iron yoke element 42 can be provided. The sensor PCB and its function are described in further detail in the parallel patent application "Device to generate an rpm-dependent signal for an electric motor, particularly for an electronically commutated DC motor" submitted by the same applicant with the same application date, to which reference is made.

In assembling the relay supporting unit with the sensor PCB 38, the coil flux guide element 42 is initially laid into the cavity 68. The sensor PCB 38 with the electronic assemblies attached (which can, for example, be designed using a PCB, SMD or MID technique) is then inserted into the cavity 68, whereby in the embodiment illustrated, the sensor PCB 38 features an extension 39 to connect the signal lines 52, and a slot 76 is provided in the supporting component 44 for the correct positioning of the sensor PCB 38. The coil flux guide element 42 can also be pre-mounted on the sensor PCB 38.

In a modified embodiment, the track pattern of the sensor PCB 38 used to connect the related components can also be placed directly on an iron yoke element which has previously been fully coated with an insulating layer. In yet another embodiment, the sensor PCB can be made from a substrate in which the yoke element is integrated.

On the outer surface of the supporting component 44 of the relay supporting unit 60 facing away from the electric motor, which lies opposite the sensor PCB 38, a lead frame 70 is inserted in the supporting component 44.

According to a preferred embodiment of the invention, the lead frame 70 is formed as a stamped sheet metal piece as can be best seen in FIG. 4. The lead frame 70 features track sections 82 which are held together via connecting bridges 83. Bores 84 to connect the relays 64 and other electronic components to control the motor as well as contact slots 86 to connect the winding ends 46' of the stator windings 14 are provided on the track sections. On its outer perimeter, the lead frame 70 features a ring or annular sections 88 which are connected via bridges 89 with the track sections 82. The ring or the annular sections 88 are used to assist assembly and can later be removed by punching.

The lead frame 70, can be connected to the supporting component 44 by various means.

In a first embodiment of the invention, the single-piece, integral lead frame 70 is initially formed in that the individual track sections 82 are connected to each other via the connecting bridges 83. The lead frame 70 is surrounded by a ring or annular sections 88 which are connected to the track sections 82 by further bridges 89 which act as assembly aids.

The lead frame 70 is placed into an injection mold and embedded at least partially in plastic through injection molding. During injection molding, the connections in the area of the bores 84 and contact slots 86 remain free whereby in the end a flat metal/plastic composite part is created.

Then the connecting bridges 83 between the individual track sections 82 are removed, preferably through punching, so that the required track layout remains. The stiffness and integrity of the entire metal/plastic composite part is provided by the plastic in which the lead frame 70 is embedded.

The actual supporting component 44 is also formed through injection molding with its chambers 66 for the relays 64 and the cavity 68 for the sensor PCB 38.

The relay supporting unit is then completed in a final assembly stage in which the relays 64 are inserted into the chambers 66 of the supporting component 44 and in which the lead frame 70 embedded in the plastic with the track sections 82 cut free, is mounted on the supporting component 44. The assembly aid 88 is preferably removed before the lead frame 70 and the supporting component 44 are put together. Subsequently, the electric connections between the relay connections and the respective track sections 82 are formed by soldering, welding or suchlike; the coil flux guide element 42 and the assembled sensor PCB 38 are mounted in the supporting component 44.

In a further embodiment of the supporting component according to the invention, the lead frame 70 is formed in the same manner as described in the first embodiment and shown in FIG. 4. The lead frame 70 is placed in an injection mold for the supporting component 44 and molded with plastic whereby the lead frame 70 is thus at least partially embedded in the plastic. Consequently, in the injection molding process, the lead frame 70 is connected to the supporting component 44 at the same time as the chambers 66 and the cavity 68 in the supporting component 44 are formed. Then, as in the first embodiment, the connecting bridges 83 and 89 are removed, so that the track sections 82 with the required track layout remain. Subsequent completion of the relay supporting unit 60 with relays 64, the coil flux guide element 42 and the sensor PCB 38 is carried out as in the first embodiment.

In another modified embodiment of the relay supporting unit according to the invention, plastic is injection molded around the lead frame 70 to create a metal/plastic composite part as in the first embodiment. However, before the injection molded lead frame 70 is connected to the supporting component 44, the lead frame 70 is initially fitted with the relays 64. The relays are electrically connected to the corresponding track sections 82 by means, for example, of soldering, welding or suchlike and the lead frame 70 fitted with the relays 64 (i.e. the assembled metal/plastic composite part) is mounted onto the supporting component 44. The coil flux guide element 42 and the assembled sensor PCB 38 are mounted as in the first and second embodiments.

Finally in another, fourth embodiment of the supporting component according to the invention, the end face of the supporting component 44 is provided with a structure adapted to the shape of the lead frame 70, so that the lead frame 70 can be precisely fitted into the end face of the supporting component 44. For this purpose, the lead frame 70 with the track sections 82, the connecting bridges 83 and the assembly aid 88 are formed as shown in FIG. 4 but not injection molded with plastic. The supporting component 44 is formed with the required profile through injection molding. The lead frame 70 is held in a positive fit in the structured end of the supporting component 44, whereby pins, bridges or suchlike formed by ultrasound can be provided. After the lead frame 70 has been connected to the supporting component 44, the connecting bridges 83 and 89 are removed, the relays mounted, the electrical connection created and the coil flux guide element 42 as well as the assembled sensor PCB 38 are mounted as in the previous embodiments. In addition to the positive connection of the lead frame 70 to the supporting component 44, the lead frame 70 can also be bonded to the supporting component 44.

FIG. 3 shows a view from above of an embodiment of the supporting component 44 of the relay supporting unit according to the invention in which six chambers 66 to accommodate the relays are arranged eccentrically and evenly distributed around the perimeter of the supporting component 44. This arrangement of the chambers 66 for the relays is particularly suited to control an electronically commutated three-phase DC motor such as shown in FIG. 1. These relays are particularly arranged at the neutral point of such a motor for the specific control and interruption of the motor phases so that during failures the currents are interrupted and the motor does not generate any torque.

The expert may contemplate any other appropriate number of chambers depending on the intended use and design of the electric motor or generator. The supporting component can additionally accommodate other components of the control circuit of the electric motor, such as diodes.

Also to be seen in FIG. 3 are three mounting tabs 72 which are provided at the circumference of the supporting component 44 to connect this to the electric motor, by means, for example, of screws as can be seen from FIGS. 1 and 2. In addition, the relay supporting unit 60 can be attached to the motor or the motor housing by means of the center screw 56 shown in FIG. 1, the internal thread 80 or by any other appropriate means.

FIG. 5 shows a view from above of a further embodiment of the relay supporting unit 60 according to the invention whereby in FIG. 5 the lead frame 70 set into the supporting component 44 as well as the sensor PCB 38 (dotted line) and the relays 64 can be seen. An elongated hole 78 is formed in each of the mounting tabs 72 protruding outwards from the supporting component 44, which makes it possible for the relay supporting unit 60 to be turned and adjusted when connected to the electric motor to achieve ideal alignment of the relays and the sensorics with the rotor/stator assembly of the motor.

The relay supporting unit according to the invention enables an assembly to be created which can be manufactured fully automatically and pre-assembled and which combines the sensor circuit, carrying low signal currents, with the supply and control circuit of the electric motor in which very large current loads can occur. This assembly can be manufactured at very reasonable costs partly since an injection molded lead frame can be used as a lead frame for the relays and other components of the control circuit and the assembly can be manufactured in an automated assembly and soldering process. The possibility of automation also increases the functional reliability of the entire assembly.

Furthermore, the relay supporting unit according to the invention also allows the sensor components to be very precisely positioned and adjusted in relation to the corresponding components of the motor in respect of their angular position and minimal axial tolerances. All the sensor components as well as the control electronics can be pre-assembled in the relay supporting unit and on completion of the assembly and adjustment of the relay supporting unit, are in a correct position in relation to the motor. The provision of elongated holes 78 in the mounting tabs 72 particularly allow the fine adjustment of the relay supporting unit of the motor. The exact positioning in both an axial and radial direction of the sensor PCB to the rotating magnets is essential in order to generate reproducible, rpm-dependent signals. The axial alignment is of special importance for the air gap between the Hall elements and coils on the PCB and the rotating magnets. The arrangement and circuitry of the eccentrically placed relays in relation to the winding ends of the stator windings is important in terms of symmetric resistance within the various phases of the motor windings and tight resistance tolerances. By means of the relay supporting unit according to the invention, a compact assembly is created which satisfies these requirements.

By compound filling the supporting component 44 of the relay supporting unit 60 and in particular the cavity for the sensor PCB, an especially robust, particle-proof assembly is created which is resistant to vibration.

The characteristics revealed in the above description, figures and claims can be important both individually or in any combination whatsoever for the realization of the invention in its various embodiments.

What is claimed is:

1. A supporting unit for an electric motor to arrange a number of relays at the end of an electric motor at which winding connections and signal lines of the electric motor are provided comprising:

a supporting component extending over the electric motor and having a plurality of integrated chambers for receiving a plurality of relays;

a connecting component placed on an outer surface of the supporting component for electrically connecting the winding connections and the relays, the connecting component integrated into the supporting component; and a sensor PCB connected to the supporting component and adapted to receive the signal lines of the electric motor.

2. A supporting unit according to claim 1, characterized in that said supporting component is made of plastic.

3. A supporting unit according to claim 2, wherein said supporting component comprises high temperature resistant plastic.

4. A supporting unit according to claim 3, wherein said high temperature resistant plastic is located around the connecting component.

5. A supporting unit according to claim 1, wherein said connecting component further comprises sheet metal.

6. A supporting unit according to claim 5, wherein said connecting component is in the form of a stamped sheet metal piece.

7. A supporting unit according to claim 6, wherein said stamped sheet metal piece is a lead frame.

8. A supporting unit according to claim 1, wherein said supporting component and said connecting component can be coupled centrally to a shaft of the electric motor.

9. A supporting unit according to claim 1, wherein said connecting component is placed on an outer surface of said supporting component facing away from the electric motor and said sensor PCB is placed on an inner surface of said supporting component.

10. A supporting unit according to claim 1, characterized in that said sensor PCB is encapsulated in said supporting component.

11. A supporting unit according to claim 1, wherein said supporting component provides a tightly sealed space to accommodate said sensor PCB.

12. A supporting unit according to claim 1, wherein said supporting component can be coupled at the end of said electric motor so that it can be turned and adjusted.

13. A supporting unit according to claim 12, wherein said supporting component features mounting tabs protruding from its circumference in order to attach said supporting component at said end of said electric motor.

14. A supporting unit according to claim 13, wherein elongated holes are formed in said mounting tabs.

15. A supporting unit according to claim 1, wherein said relays are mounted in said supporting component.

16. A supporting unit according to claim 15, wherein two to nine chambers are provided in said supporting component to accommodate said relays.

17. A supporting unit according to claim 15, wherein three or six chambers are provided in said supporting component to accommodate said relays.

18. A supporting unit according to claim 15, wherein said supporting component further comprises a plurality of depressions to receive and insulate said connecting component.

19. A supporting unit according to claim 1, wherein said electric motor is a DC motor.

20. A supporting unit for an electric motor to arrange a number of relays at the end of an electric motor at which winding connections and signal lines of the electric motor are provided comprising:
    a supporting component extending over the electric motor and having a plurality of integrated chambers for receiving a plurality of relays;
    a connecting component to electrically connect the winding connections and the relays, the connecting component integrated into the supporting component; and
    the supporting component and the connecting component adapted to be coupled to a shaft of the electric motor, the connecting component placed on an outer surface of said supporting component facing away from the electric motor and a sensor PCB placed on an inner surface of said supporting component;
    wherein the sensor PCB is adapted to receive the signal lines of the electric motor.

21. A supporting unit for an electric motor to arrange a number of relays at the end of an electric motor at which winding connections and signal lines of the electric motor are provided comprising:
    a supporting component extending over the electric motor and having a plurality of integrated chambers for receiving a plurality of relays; and
    a connecting component to electrically connect the winding connections and the relays, the connecting component integrated into the supporting component;
    wherein the connecting component is placed on an outer surface of said supporting component facing away from the electric motor and a sensor PCB is encapsulated in the supporting component.

22. The supporting unit of claim 21, wherein the supporting component provides a sealed space to accommodate the sensor PCB.

23. The supporting unit of claim 21, wherein the supporting component further comprises mounting tabs for attaching the supporting component to the electric motor.

24. The supporting unit of claim 21, wherein the supporting component further comprises mounting tabs having at least one elongated hole.

25. A supporting unit for an electric motor to arrange a number of relays at the end of an electric motor at which winding connections and signal lines of the electric motor are provided comprising:
    a supporting component extending over the electric motor and having a plurality of integrated chambers for receiving a plurality of relays;
    a connecting component placed on an outer surface of the supporting component for electrically connecting the winding connections and the relays, the connecting component integrated into the supporting component; and
    a sensor PCB connected to the supporting component and adapted to receive the signal lines of the electric motor
    wherein said supporting component is coupled at the end of said electric motor so that it can be turned and adjusted.

26. A supporting unit according to claim 25, wherein said supporting component features mounting tabs protruding from its circumference in order to attach said supporting component at said end of said electric motor.

27. A supporting unit according to claim 25, wherein elongated holes are formed in said mounting tabs.

* * * * *